(12) United States Patent
Inoue

(10) Patent No.: US 10,788,645 B2
(45) Date of Patent: Sep. 29, 2020

(54) IMAGING LENS, PROJECTION-TYPE DISPLAY APPARATUS, AND IMAGING APPARATUS

(71) Applicant: FUJIFILM Corporation, Tokyo (JP)

(72) Inventor: Kazuki Inoue, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 230 days.

(21) Appl. No.: 16/129,911

(22) Filed: Sep. 13, 2018

(65) Prior Publication Data
US 2019/0094485 A1 Mar. 28, 2019

(30) Foreign Application Priority Data

Sep. 25, 2017 (JP) ................................ 2017-183861

(51) Int. Cl.
*G02B 7/04* (2006.01)
*G02B 15/163* (2006.01)
*G02B 27/00* (2006.01)
*G02B 13/16* (2006.01)
*G02B 13/06* (2006.01)

(52) U.S. Cl.
CPC ............ *G02B 7/04* (2013.01); *G02B 13/16* (2013.01); *G02B 15/163* (2013.01); *G02B 27/0037* (2013.01); *G02B 13/06* (2013.01)

(58) Field of Classification Search
USPC .................... 359/642, 811, 819, 822, 823
See application file for complete search history.

(56) References Cited

U.S. PATENT DOCUMENTS 10,268,027 B2 * 4/2019 Inoue ..................... G02B 13/18
10,620,411 B2 * 4/2020 Imaoka ................. G02B 13/18

2004/0032653 A1 2/2004 Gohman
2010/0172022 A1 7/2010 Lin et al.
2011/0002034 A1 1/2011 Shimo et al.
2016/0246037 A1 8/2016 Amano
2016/0246038 A1 8/2016 Amano

FOREIGN PATENT DOCUMENTS

| JP | 2006-523318 A | 10/2006 |
| JP | 2007047767 A | 2/2007 |
| JP | 2013195747 A | 9/2013 |
| JP | 5625904 B2 | 11/2014 |
| JP | 2016-143032 A | 8/2016 |
| JP | 2016-156984 A | 9/2016 |
| JP | 2016-156986 A | 9/2016 |

OTHER PUBLICATIONS

An Office Action mailed by the Japanese Patent Office dated May 19, 2020, which corresponds to Japanese Design Application No. 2017-183861 9with English translation.

* cited by examiner

*Primary Examiner* — Tuyen Tra
(74) *Attorney, Agent, or Firm* — Studebaker & Brackett PC

(57) ABSTRACT

The imaging lens consists of a first imaging optical system that forms an intermediate image at a position conjugate to a magnified-side imaging surface and a second imaging optical system that re-forms the intermediate image on a reduced-side imaging surface, in order from a magnified side. The first imaging optical system includes at least four consecutive negative lenses, a first sub-lens group consisting of a positive lens, a negative lens, and a positive lens in order from the magnified side, and a focus lens group adjacent to a reduced side of the first sub-lens group, in order from a position closest to the magnified side, and only the focus lens group moves along an optical axis during focusing.

20 Claims, 9 Drawing Sheets

EXAMPLE 2

EXAMPLE 2

IMAGING LENS, PROJECTION-TYPE DISPLAY APPARATUS, AND IMAGING APPARATUS

CROSS REFERENCE TO RELATED APPLICATIONS

The present application claims priority under 35 U.S.C. § 119 to Japanese Patent Application No. 2017-183861 filed on Sep. 25, 2017. The above application is hereby expressly incorporated by reference, in its entirety, into the present application.

BACKGROUND OF THE INVENTION

1. Field of the Invention

The present invention relates to an imaging lens that forms an intermediate image, a projection-type display apparatus including this imaging lens, and an imaging apparatus including this imaging lens.

2. Description of the Related Art

Hitherto, projection-type display apparatuses using a light valve such as a liquid crystal display device or a Digital Micromirror Device (DMD: Registered Trademark) have been widely used. Particularly, a configuration has been widely used in which three light valves are used to correspond to illumination light beams of three primary colors of red, green and blue, respectively, light beams modulated in individual light valves are synthesized using a prism or the like, and an image is displayed on a screen through an imaging lens.

In such an imaging lens used in a projection-type display apparatus of a type in which respective modulated light beams from three light valves are synthesized and projected in a color synthesis optical system, a long back focus is required in order to dispose a prism or the like that performs color synthesis, as described above, and to avoid a thermal problem. Further, since the color synthesis prism has its spectral characteristics changed depending on the angle of incident light, a lens for projection is required to have characteristics in which an incident pupil in a case where a reduced side is set to an incident side is located at a sufficiently long distance, that is, telecentricity on the reduced side.

In addition, this type of imaging lens requires satisfactory aberration correction appropriate for the resolution of the light valve. Further, from the viewpoint of installability, it is required to have a high zooming function, and to have a wider angle of view in order to meet a demand for performing projection onto a large-sized screen from a short distance.

In order to respond to such a demand, imaging lenses are proposed in which an intermediate image is formed at a position conjugate to a reduced-side imaging surface, and this intermediate image is re-formed on a magnified-side imaging surface (for example, JP2006-523318A, JP5625904B, JP2016-143032A, JP2016-156984A, and JP2016-156986A).

SUMMARY OF THE INVENTION

However, in the lenses disclosed in JP2006-523318A, JP5625904B and JP2016-143032A, the angle of view is not sufficient, and the fluctuation of aberration (distance fluctuation of aberration) when projection distance or object distance fluctuates is also not sufficiently satisfactory. In the lens disclosed in JP2016-156984A, an F-Number is not sufficiently small, and the distance fluctuation of aberration is also not sufficiently satisfactory. In the lens disclosed in JP2016-156986A, the distance fluctuation of aberration is not sufficiently satisfactory.

The present invention is contrived in view of such circumstances, and an object thereof is to provide an imaging lens of a type in which an intermediate image is formed with a small F-Number and a small distance fluctuation of aberration while having a wide angle, a projection-type display apparatus including this imaging lens, and an imaging apparatus including this imaging lens.

According to the present invention, there is provided an imaging lens comprising, in order from a magnified side: a first imaging optical system that forms an intermediate image at a position conjugate to a magnified-side imaging surface; a second imaging optical system that re-forms the intermediate image on a reduced-side imaging surface, wherein the first imaging optical system includes at least four consecutive negative lenses, a first sub-lens group consisting of a positive lens, a negative lens, and a positive lens in order from the magnified side, and a focus lens group adjacent to a reduced side of the first sub-lens group, in order from a position closest to the magnified side, and only the focus lens group moves along an optical axis during focusing.

In the imaging lens of the present invention, in a case where a focal length of the focus lens group is set to f4, and a composite focal length from a negative lens of the first imaging optical system closest to the magnified side to a positive lens of the first sub-lens group on the reduced side is set to fn1, it is preferable to satisfy the following Conditional Expression (1), and more preferable to satisfy the following Conditional Expression (1-1).

$$-4.8 < f4/fn1 < -3 \tag{1}$$

$$-4.5 < f4/fn1 < -3.3 \tag{1-1}$$

In addition, in a case where a focal length of the first imaging optical system is set to fa, and a composite focal length from a negative lens of the first imaging optical system closest to the magnified side to a lens of the focus lens group closest to the reduced side is set to fn2, it is preferable to satisfy the following Conditional Expression (2), and more preferable to satisfy the following Conditional Expression (2-1).

$$0.1 < fa/fn2 < 0.26 \tag{2}$$

$$0.12 < fa/fn2 < 0.24 \tag{2-1}$$

In addition, in a case where a height of a paraxial on-axis light ray on a surface on the reduced side of a positive lens of the first sub-lens group on the reduced side is set to h2, and a height of a paraxial on-axis light ray on a surface on the magnified side of a negative lens of the first imaging optical system closest to the magnified side is set to h1, it is preferable to satisfy the following Conditional Expression (3), and more preferable to satisfy the following Conditional Expression (3-1). Meanwhile, h1 and h2 are based on a definition in paraxial light ray tracing according to Expressions (2.10) to (2.12), pp. 19 of "Optical Technology Series 1 Lens Design Method" (authored by Yoshiya Matsui, Kyoritsu Shuppan Co., Ltd.).

$$4 < h2/h1 < 7.5 \quad (3)$$

$$4.5 < h2/h1 < 7 \quad (3\text{-}1)$$

In addition, in a case where a focal length of a positive lens of the first sub-lens group on the reduced side is set to f3, and a focal length of a positive lens of the first sub-lens group on the magnified side is set to f1, it is preferable to satisfy the following Conditional Expression (4).

$$1 < f3/f1 < 1.4 \quad (4)$$

In addition, it is preferable that the first imaging optical system includes a cemented lens in which a first positive lens, a second negative lens having a smaller Abbe number than that of the first positive lens, and a third positive lens having a larger Abbe number than that of the second negative lens are cemented together in order from the magnified side.

When the first imaging optical system is provided with the cemented lens, it is preferable to satisfy the following Conditional Expression (5) in a case where an Abbe number of the first positive lens is set to vdc1, and an Abbe number of the second negative lens is set to vdc2.

$$20 < vdc1 - vdc2 < 40 \quad (5)$$

In addition, when the first imaging optical system is provided with the cemented lens, it is preferable to satisfy the following Conditional Expression (6) in a case where an Abbe number of the second negative lens is set to vdc2, and an Abbe number of the third positive lens is set to vdc3.

$$-70 < vdc2 - vdc3 < -50 \quad (6)$$

In addition, when the first imaging optical system is provided with the cemented lens, it is preferable to satisfy the following Conditional Expression (7) in a case where a focal length of the whole system during focusing on an infinite object is set to f, and a focal length of the cemented lens is set to fc.

$$-0.15 < |f|/fc < 0 \quad (7)$$

In addition, when the first imaging optical system is provided with the cemented lens, it is preferable to satisfy the following Conditional Expression (8) in a case where a focal length of the whole system during focusing on an infinite object is set to f, and a focal length of the first positive lens is set to fc1.

$$0.05 < |f|/fc1 < 0.3 \quad (8)$$

In addition, when the first imaging optical system is provided with the cemented lens, it is preferable to satisfy the following Conditional Expression (9) in a case where a focal length of the whole system during focusing on an infinite object is set to f, and a focal length of the second negative lens is set to fc2.

$$-0.5 < |f|/fc2 < -0.1 \quad (9)$$

In addition, when the first imaging optical system is provided with the cemented lens, it is preferable to satisfy the following Conditional Expression (10) in a case where a focal length of the whole system during focusing on an infinite object is set to f, and a focal length of the third positive lens is set to fc3.

$$0.1 < |f|/fc3 < 0.4 \quad (10)$$

In addition, in a case where a focal length of the whole system during focusing on an infinite object is set to f, and a focal length of the first imaging optical system is set to fa, it is preferable to satisfy the following Conditional Expression (11).

$$0.1 < |f|/fa < 0.7 \quad (11)$$

In addition, in a case where a focal length of the whole system during focusing on an infinite object is set to f, and a focal length of the second imaging optical system is set to fb, it is preferable to satisfy the following Conditional Expression (12).

$$0.03 < |f|/fb < 0.2 \quad (12)$$

In addition, it is preferable that the focus lens group consists of one lens.

According to the present invention, there is provided a projection-type display apparatus comprising: a light source; a light valve on which light from the light source is incident; and the imaging lens described above as an imaging lens that projects an optical image of light optically modulated by the light valve onto a screen.

According to the present invention, there is provided an imaging apparatus comprising the imaging lens of the present invention described above.

Meanwhile, the term "consist of ~" is intended to be allowed to include a lens having substantially no power, optical elements, other than a lens, such as a stop, a mask, cover glass, or a filter, mechanism portions such as a lens flange, a lens barrel, an imaging element, or a camera-shake correction mechanism, and the like, in addition to the things enumerated as elements.

In addition, in the Abbe numbers in the respective conditional expressions, the d line is used as a reference wavelength.

In addition, the surface shape, the sign of the refractive power, and the curvature radius of the lens are assumed to be those in a paraxial region in a case where an aspherical surface is included.

The imaging lens of the present invention consists of a first imaging optical system that forms an intermediate image at a position conjugate to a magnified-side imaging surface and a second imaging optical system that re-forms the intermediate image on a reduced-side imaging surface, in order from a magnified side. The first imaging optical system includes at least four consecutive negative lenses, a first sub-lens group consisting of a positive lens, a negative lens, and a positive lens in order from the magnified side, and a focus lens group adjacent to a reduced side of the first sub-lens group, in order from a position closest to the magnified side, and only the focus lens group moves along an optical axis during focusing. Therefore, it is possible to provide an imaging lens with a small F-Number and a small distance fluctuation of aberration while having a wide angle, a projection-type display apparatus including this imaging lens, and an imaging apparatus including this imaging lens.

DESCRIPTION OF THE PREFERRED EMBODIMENTS

Figure 1:
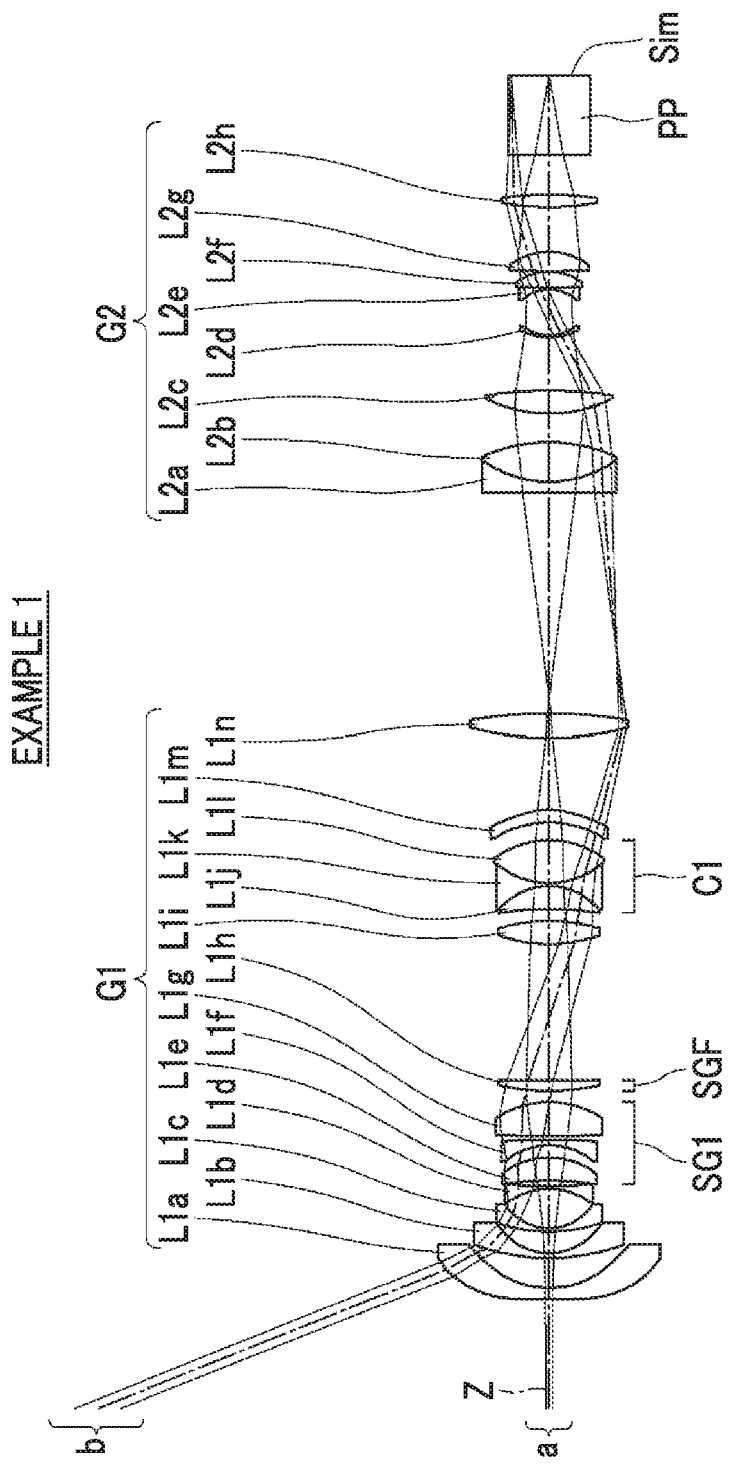
FIG. 1 is a cross-sectional view illustrating a lens configuration of an imaging lens (in common with that of Example 1) according to an embodiment of the present invention.

Hereinafter, an embodiment of the present invention will be described in detail with reference to the accompanying drawings. FIG. 1 is a cross-sectional view illustrating a lens configuration of an imaging lens according to an embodiment of the present invention. The configuration example shown in FIG. 1 is in common with the configuration of an imaging lens of Example 1 described later. In FIG. 1, a left side is a magnified side, and a right side is a reduced side. In addition, FIG. 1 shows a state of being focused on an infinite object, and shows an on-axis light flux a and a light flux b of the maximum angle of view together.

This imaging lens is mounted on, for example, a projection-type display apparatus, and can be used in projecting image information displayed on a light valve onto a screen. In FIG. 1, on the assumption of a case of being mounted on the projection-type display apparatus, an optical member PP assumed to be a filter, a prism and the like which are used in a color synthesis portion or an illumination light separation portion, and the image display surface Sim of the light valve located on the surface of the optical member PP on the reduced side are also shown together. In the projection-type display apparatus, a light flux to which image information is given on the image display surface Sim on an image display device is incident on this imaging lens through the optical member PP, and is projected onto a screen, not shown, by this imaging lens.

As shown in FIG. 1, the imaging lens of the present embodiment is composed of a first imaging optical system G1 that forms an intermediate image at a position conjugate to a magnified-side imaging surface and a second imaging optical system G2 that re-forms the intermediate image on a reduced-side imaging surface (image display surface Sim), in order from the magnified side.

In an imaging lens of a type in which a normal intermediate image is not formed, in a case where an attempt is made to widen an angle by reducing a focal length, a lens on the magnified side becomes excessively large in any way. However, in an imaging lens of a type in which an intermediate image is formed as in the present embodiment, it is possible to shorten the back focus of a lens system (first imaging optical system G1 in the example shown in FIG. 1) closer to the magnified side than to the intermediate image, and to reduce lens diameters on the magnified side. Therefore, the lens system is suitable for widening an angle by reducing a focal length.

The first imaging optical system G1 includes at least four consecutive negative lenses, a first sub-lens group SG1 consisting of a positive lens, a negative lens, and a positive lens in order from the magnified side, and a focus lens group SGF adjacent to the reduced side of the first sub-lens group SG1, in order from a position closest to the magnified side, and is configured such that only the focus lens group SGF moves along an optical axis Z during focusing.

In the first imaging optical system G1, it is possible to suppress a field curvature by disposing at least four consecutive negative lenses at a position closest to the magnified side.

In addition, in the first imaging optical system G1, since the variation of the angle of light incident on the focus lens group SGF can be suppressed by consecutively disposing the first sub-lens group SG1 consisting of a positive lens, a negative lens, and a positive lens in order from the magnified side and the focus lens group SGF, on the reduced side of four consecutive negative lenses, it is possible to suppress aberration. In addition, since sensitivity is reduced by the variation of the angle of light incident on the focus lens group SGF being suppressed, it is possible to improve manufacturability. In addition, since aberration is suppressed on the magnified side of the focus lens group SGF, it is possible to suppress the number of lenses constituting the focus lens group SGF. Further, it is possible to suppress the distance fluctuation of aberration.

In the imaging lens of the present embodiment, in a case where the focal length of the focus lens group SGF is set to f4, and a composite focal length from a negative lens of the first imaging optical system G1 closest to the magnified side to a positive lens of the first sub-lens group SG1 on the reduced side is set to fn1, it is preferable to satisfy Conditional Expression (1). It is possible to suppress breathing (fluctuation in angle of view) due to the distance fluctuation by satisfying Conditional Expression (1). Meanwhile, in a case where Conditional Expression (1-1) is satisfied, it is possible to make characteristics more satisfactory.

$$-4.8 < f4/fn1 < -3 \tag{1}$$

$$-4.5 < f4/fn1 < -3.3 \tag{1-1}$$

In addition, in a case where the focal length of the first imaging optical system G1 is set to fa, and a composite focal length from a negative lens of the first imaging optical system G1 closest to the magnified side to a lens of the focus lens group SGF closest to the reduced side is set to fn2, it is preferable to satisfy Conditional Expression (2). It is possible to suppress breathing (fluctuation in angle of view) due to the distance fluctuation by satisfying Conditional Expression (2). Meanwhile, in a case where Conditional Expression (2-1) is satisfied, it is possible to make characteristics more satisfactory.

$$0.1 < fa/fn2 < 0.26 \tag{2}$$

$$0.12 < fa/fn2 < 0.24 \tag{2-1}$$

In addition, in a case where the height of a paraxial on-axis light ray on a surface on the reduced side of a positive lens of the first sub-lens group SG1 on the reduced side is set to h2, and the height of a paraxial on-axis light ray on a surface on the magnified side of a negative lens of the first imaging optical system G1 closest to the magnified side is set to h1, it is preferable to satisfy Conditional Expression (3). It is possible to suppress breathing (fluctuation in angle of view) due to the distance fluctuation by satisfying Conditional Expression (3). Meanwhile, in a case where Conditional Expression (3-1) is satisfied, it is possible to make characteristics more satisfactory.

$$4 < h2/h1 < 7.5 \tag{3}$$

$$4.5 < h2/h1 < 7 \tag{3-1}$$

In addition, in a case where the focal length of a positive lens of the first sub-lens group SG1 on the reduced side is set to f3, and the focal length of a positive lens of the first sub-lens group SG1 on the magnified side is set to f1, it is preferable to satisfy Conditional Expression (4). Since a balance between refractive powers can be kept with respect to lenses closer to the magnified side than to the focus lens group SGF by satisfying Conditional Expression (4), it is possible to suppress spherical aberration and astigmatism, and to suppress a fluctuation in aberration due to focusing. Meanwhile, in a case where Conditional Expression (4-1) is satisfied, it is possible to make characteristics more satisfactory.

$$1 < f3/f1 < 1.4 \tag{4}$$

$$1 < f3/f1 < 1.35 \tag{4-1}$$

In addition, it is preferable that the first imaging optical system G1 includes a cemented lens C1 in which a first positive lens, a second negative lens having a smaller Abbe number than that of the first positive lens, and a third positive lens having a larger Abbe number than that of the second negative lens are cemented together in order from the magnified side. With such a configuration, it is possible to suppress high-order aberration, and to reduce the absolute value of a curvature radius. Therefore, it is possible to suppress on-axis chromatic aberration and lateral chromatic aberration.

When the first imaging optical system G1 is provided with the cemented lens C1, it is preferable to satisfy Conditional Expression (5) in a case where the Abbe number of the first positive lens is set to vdc1, and the Abbe number of the second negative lens is set to vdc2. It is possible to suppress on-axis chromatic aberration and lateral chromatic aberration by satisfying Conditional Expression (5). Meanwhile, in a case where Conditional Expression (5-1) is satisfied, it is possible to make characteristics more satisfactory.

$$20 < vdc1 - vdc2 < 40 \tag{5}$$

$$25 < vdc1 - vdc2 < 35 \tag{5-1}$$

In addition, when the first imaging optical system G1 is provided with the cemented lens C1, it is preferable to satisfy Conditional Expression (6) in a case where the Abbe number of the second negative lens is set to vdc2, and the Abbe number of the third positive lens is set to vdc3. It is possible to suppress on-axis chromatic aberration and lateral chromatic aberration by satisfying Conditional Expression (6). Meanwhile, in a case where Conditional Expression (6-1) is satisfied, it is possible to make characteristics more satisfactory.

$$-70 < vdc2 - vdc3 < -50 \tag{6}$$

$$-65 < vdc2 - vdc3 < -55 \tag{6}$$

In addition, when the first imaging optical system G1 is provided with the cemented lens C1, it is preferable to satisfy Conditional Expression (7) in a case where the focal length the whole system during focusing on the infinite object is set to f, and the focal length of the cemented lens C1 is set to fc. It is possible to suppress on-axis chromatic aberration and lateral chromatic aberration by satisfying Conditional Expression (7). Meanwhile, in a case where Conditional Expression (7-1) is satisfied, it is possible to make characteristics more satisfactory.

$$-0.15 < |f|/fc < 0 \tag{7}$$

$$-0.1 < |f|/fc < 0 \tag{7-1}$$

In addition, when the first imaging optical system G1 is provided with the cemented lens C1, it is preferable to satisfy Conditional Expression (8) in a case where the focal length of the whole system during focusing on the infinite object is set to f, and the focal length of the first positive lens is set to fc1. It is possible to suppress on-axis chromatic aberration and lateral chromatic aberration by satisfying Conditional Expression (8). Meanwhile, in a case where Conditional Expression (8-1) is satisfied, it is possible to make characteristics more satisfactory.

$$0.05 < |f|/fc1 < 0.3 \tag{8}$$

$$0.1 < |f|/fc1 < 0.25 \tag{8-1}$$

In addition, when the first imaging optical system G1 is provided with the cemented lens C1, it is preferable to satisfy Conditional Expression (9) in a case where the focal length of the whole system during focusing on the infinite object is set to f, and the focal length of the second negative lens is set to fc2. It is possible to suppress on-axis chromatic aberration and lateral chromatic aberration by satisfying Conditional Expression (9). Meanwhile, in a case where Conditional Expression (9-1) is satisfied, it is possible to make characteristics more satisfactory.

$$-0.5 < |f|/fc2 < -0.1 \tag{9}$$

$$-0.45 < |f|/fc2 < -0.15 \tag{9-1}$$

In addition, when the first imaging optical system G1 is provided with the cemented lens C1, it is preferable to satisfy Conditional Expression (10) in a case where the focal length of the whole system during focusing on the infinite object is set to f, and the focal length of the third positive lens is set to fc3. It is possible to suppress on-axis chromatic aberration and lateral chromatic aberration by satisfying Conditional Expression (10). Meanwhile, in a case where Conditional Expression (10-1) is satisfied, it is possible to make characteristics more satisfactory.

$$0.1 < |f|/fc3 < 0.4 \tag{10}$$

$$0.15 < |f|/fc3 < 0.35 \tag{10-1}$$

In addition, in a case where the focal length of the whole system during focusing on the infinite object is set to f, and the focal length of the first imaging optical system G1 is set to fa, it is preferable to satisfy Conditional Expression (11). The value (|f|/fa) is not set to be equal to or less than the lower limit of Conditional Expression (11), and thus it is possible to suppress the entire length. The value (|f|/fa) is not set to be equal to or greater than the upper limit of Conditional Expression (11), and thus it is possible to suppress a field curvature. Meanwhile, in a case where Conditional Expression (11-1) is satisfied, it is possible to make characteristics more satisfactory.

$$0.1 < |f|/fa < 0.7 \tag{11}$$

$$0.15 < |f|/fa < 0.65 \tag{11-1}$$

In addition, in a case where the focal length of the whole system during focusing on the infinite object is set to f, and the focal length of the second imaging optical system G2 is set to fb, it is preferable to satisfy Conditional Expression (12). The value (|f|/fb) is not set to be equal to or less than the lower limit of Conditional Expression (12), and thus it is possible to suppress the entire length. The value (|f|/fb) is not set to be equal to or greater than the upper limit of Conditional Expression (12), and thus it is possible to suppress a field curvature. Meanwhile, in a case where Conditional Expression (12-1) is satisfied, it is possible to make characteristics more satisfactory.

$$0.03 < |f|/fb < 0.2 \quad (12)$$

$$0.05 < |f|/fb < 0.18 \quad (12\text{-}1)$$

In addition, it is preferable that the focus lens group SGF consists of one lens. With such a configuration, it is possible to achieve a reduction in the weight of the focus lens group SGF.

In addition, in a case where the focal length of the focus lens group SGF is set to f4, and the focal length of a positive lens of the first sub-lens group SG1 on the magnified side is set to f1, it is preferable to satisfy Conditional Expression (13). Since a balance between refractive powers can be kept with respect to lenses closer to the magnified side than to the focus lens group SGF by satisfying Conditional Expression (13), it is possible to suppress distortion and lateral chromatic aberration, and to suppress a fluctuation in aberration due to focusing. Meanwhile, in a case where Conditional Expression (13-1) is satisfied, it is possible to make characteristics more satisfactory.

$$1.7 < f4/f1 < 3.5 \quad (13)$$

$$2 < f4/f1 < 30.2 \quad (13\text{-}1)$$

In addition, in a case where the focal length of the first imaging optical system G1 is set to fa, and the focal length of a positive lens of the first sub-lens group SG1 on the magnified side is set to f1, it is preferable to satisfy Conditional Expression (14). Since a balance between refractive powers can be kept with respect to lenses closer to the magnified side than to the focus lens group SGF by satisfying Conditional Expression (14), it is possible to suppress distortion and lateral chromatic aberration, and to suppress a fluctuation in aberration due to focusing. Meanwhile, in a case where Conditional Expression (14-1) is satisfied, it is possible to make characteristics more satisfactory.

$$0 < fa/f1 < 0.8 \quad (14)$$

$$0.2 < fa/f1 < 0.6 \quad (14\text{-}1)$$

In addition, in a case where the focal length of the focus lens group SGF is set to f4, and the focal length of a positive lens of the first sub-lens group SG1 on the reduced side is set to f3, it is preferable to satisfy Conditional Expression (15). Since a balance between refractive powers can be kept with respect to lenses closer to the magnified side than to the focus lens group SGF by satisfying Conditional Expression (15), it is possible to suppress distortion and lateral chromatic aberration, and to suppress a fluctuation in aberration due to focusing. Meanwhile, in a case where Conditional Expression (15-1) is satisfied, it is possible to make characteristics more satisfactory.

$$1 < f4/f3 < 3 \quad (15)$$

$$1.5 < f4/f3 < 2.5 \quad (15\text{-}1)$$

In addition, in a case where the focal length of the first imaging optical system G1 is set to fa, and the focal length of a positive lens of the first sub-lens group SG1 on the reduced side is set to f3, it is preferable to satisfy Conditional Expression (16). Since a balance between refractive powers can be kept with respect to lenses closer to the magnified side than to the focus lens group SGF by satisfying Conditional Expression (16), it is possible to suppress distortion and lateral chromatic aberration, and to suppress a fluctuation in aberration due to focusing. Meanwhile, in a case where Conditional Expression (16-1) is satisfied, it is possible to make characteristics more satisfactory.

$$0 < fa/f3 < 0.5 \quad (16)$$

$$0.1 < fa/f3 < 0.4 \quad (16\text{-}1)$$

In addition, in a case where the focal length of the focus lens group SGF is set to f4, and the composite focal length of a magnified-side positive lens and a negative lens of the first sub-lens group SG1 is set to f12, it is preferable to satisfy Conditional Expression (17). Since a balance between refractive powers can be kept with respect to lenses closer to the magnified side than to the focus lens group SGF by satisfying Conditional Expression (17), it is possible to suppress distortion and lateral chromatic aberration, and to suppress a fluctuation in aberration due to focusing. Meanwhile, in a case where Conditional Expression (17-1) is satisfied, it is possible to make characteristics more satisfactory.

$$0 < f4/f12 < 0.75 \quad (17)$$

$$0.05 < f4/f12 < 0.7 \quad (17\text{-}1)$$

In addition, in a case where the focal length of the first imaging optical system G1 is set to fa, and the composite focal length of a magnified-side positive lens and a negative lens of the first sub-lens group SG1 is set to f12, it is preferable to satisfy Conditional Expression (18). Since a balance between refractive powers can be kept with respect to lenses closer to the magnified side than to the focus lens group SGF by satisfying Conditional Expression (18), it is possible to suppress distortion and lateral chromatic aberration, and to suppress a fluctuation in aberration due to focusing. Meanwhile, in a case where Conditional Expression (18-1) is satisfied, it is possible to make characteristics more satisfactory.

$$0 < fa/f12 < 0.15 \quad (18)$$

$$0 < fa/f12 < 0.1 \quad (18\text{-}1)$$

In addition, in a case where the focal length of the focus lens group SGF is set to f4, and the composite focal length of a negative lens and a reduced-side positive lens of the first sub-lens group SG1 is set to f23, it is preferable to satisfy Conditional Expression (19). Since a balance between refractive powers can be kept with respect to lenses closer to the magnified side than to the focus lens group SGF by satisfying Conditional Expression (19), it is possible to suppress distortion and lateral chromatic aberration, and to suppress a fluctuation in aberration due to focusing. Meanwhile, in a case where Conditional Expression (19-1) is satisfied, it is possible to make characteristics more satisfactory.

$$0.2 < f4/f23 < 4 \quad (19)$$

$$0.2 < f4/f23 < 3.5 \quad (19\text{-}1)$$

In addition, in a case where the focal length of the first imaging optical system G1 is set to fa, and the composite focal length of a negative lens and a reduced-side positive lens of the first sub-lens group SG1 is set to f23, it is preferable to satisfy Conditional Expression (20). Since a balance between refractive powers can be kept with respect to lenses closer to the magnified side than to the focus lens group SGF by satisfying Conditional Expression (20), it is possible to suppress distortion and lateral chromatic aberration, and to suppress a fluctuation in aberration due to focusing. Meanwhile, in a case where Conditional Expression (20-1) is satisfied, it is possible to make characteristics more satisfactory.

$$0<fa/f23<0.4 \quad (20)$$

$$0<fa/f23<0.35 \quad (20\text{-}1)$$

In addition, in a case where the focal length of the focus lens group SGF is set to f4, and the focal length of the first sub-lens group SG1 is set to f13, it is preferable to satisfy Conditional Expression (21). Since a balance between refractive powers can be kept with respect to lenses closer to the magnified side than to the focus lens group SGF by satisfying Conditional Expression (21), it is possible to suppress distortion and lateral chromatic aberration, and to suppress a fluctuation in aberration due to focusing. Meanwhile, in a case where Conditional Expression (21-1) is satisfied, it is possible to make characteristics more satisfactory.

$$1.5<f4/f13<3 \quad (21)$$

$$1.75<f4/f13<2.75 \quad (21\text{-}1)$$

In addition, in a case where the focal length of the first imaging optical system G1 is set to fa, and the focal length of the first sub-lens group SG1 is set to f13, it is preferable to satisfy Conditional Expression (22). Since a balance between refractive powers can be kept with respect to lenses closer to the magnified side than to the focus lens group SGF by satisfying Conditional Expression (22), it is possible to suppress distortion and lateral chromatic aberration, and to suppress a fluctuation in aberration due to focusing. Meanwhile, in a case where Conditional Expression (22-1) is satisfied, it is possible to make characteristics more satisfactory.

$$0.15<fa/f13<0.3 \quad (22)$$

$$0.18<fa/f13<0.25 \quad (22\text{-}1)$$

In addition, in a case where the focal length of the whole system during focusing on the infinite object is set to f, and the focal length of the first sub-lens group SG1 is set to f13, it is preferable to satisfy Conditional Expression (23). Since a balance between refractive powers can be kept with respect to lenses closer to the magnified side than to the focus lens group SGF by satisfying Conditional Expression (23), it is possible to suppress distortion and lateral chromatic aberration, and to suppress a fluctuation in aberration due to focusing. Meanwhile, in a case where Conditional Expression (23-1) is satisfied, it is possible to make characteristics more satisfactory.

$$0<|f|/f13<0.3 \quad (23)$$

$$0.05<|f|/f13<0.2 \quad (23\text{-}1)$$

In addition, in a case where the focal length of the whole system during focusing on the infinite object is set to f, and the composite focal length of a magnified-side positive lens and a negative lens of the first sub-lens group SG1 is set to f12, it is preferable to satisfy Conditional Expression (24). Since a balance between refractive powers can be kept with respect to lenses closer to the magnified side than to the focus lens group SGF by satisfying Conditional Expression (24), it is possible to suppress distortion and lateral chromatic aberration, and to suppress a fluctuation in aberration due to focusing. Meanwhile, in a case where Conditional Expression (24-1) is satisfied, it is possible to make characteristics more satisfactory.

$$0<|f|/f12<0.15 \quad (24)$$

$$0<|f|/f12<0.1 \quad (24\text{-}1)$$

In addition, in a case where the focal length of the whole system during focusing on the infinite object is set to f, and the composite focal length of a negative lens and a reduced-side positive lens of the first sub-lens group SG1 is set to f23, it is preferable to satisfy Conditional Expression (25). Since a balance between refractive powers can be kept with respect to lenses closer to the magnified side than to the focus lens group SGF by satisfying Conditional Expression (25), it is possible to suppress distortion and lateral chromatic aberration, and to suppress a fluctuation in aberration due to focusing. Meanwhile, in a case where Conditional Expression (25-1) is satisfied, it is possible to make characteristics more satisfactory.

$$0<|f|/f23<0.3 \quad (25)$$

$$0<|f|/f23<0.25 \quad (25\text{-}1)$$

In addition, in the example shown in FIG. 1, an example is shown in which the optical member PP is disposed between the lens system and the image display surface Sim, but instead of disposing various types of filters, such as a low-pass filter or a filter in which a specific wavelength region is cut, between the lens system and the image display surface Sim, various types of filters described above may be disposed between respective lenses, or coating having the same actions as those of various types of filters may be performed on the lens surface of any of the lenses.

Figure 2:
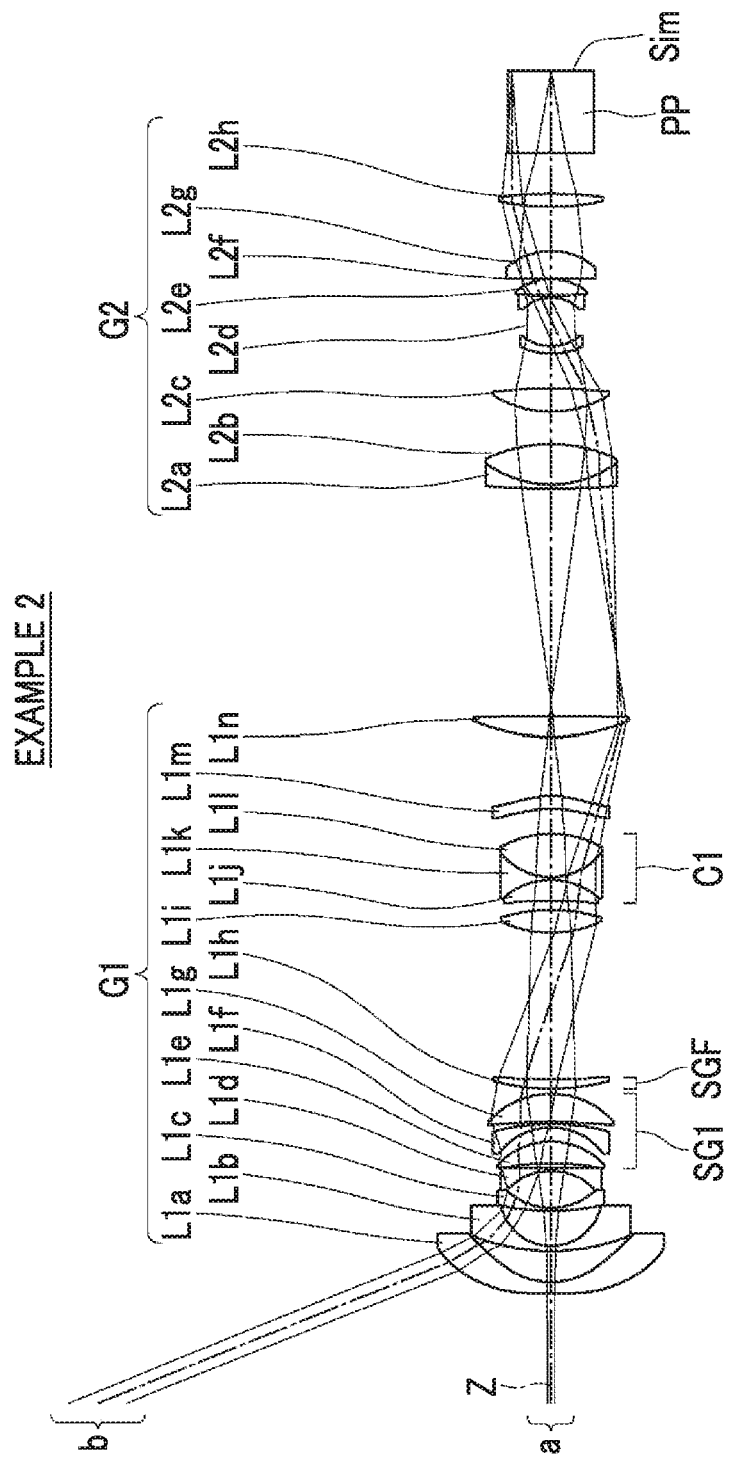
FIG. 2 is a cross-sectional view illustrating a lens configuration of an imaging lens of Example 2 of the present invention.
Figure 3:
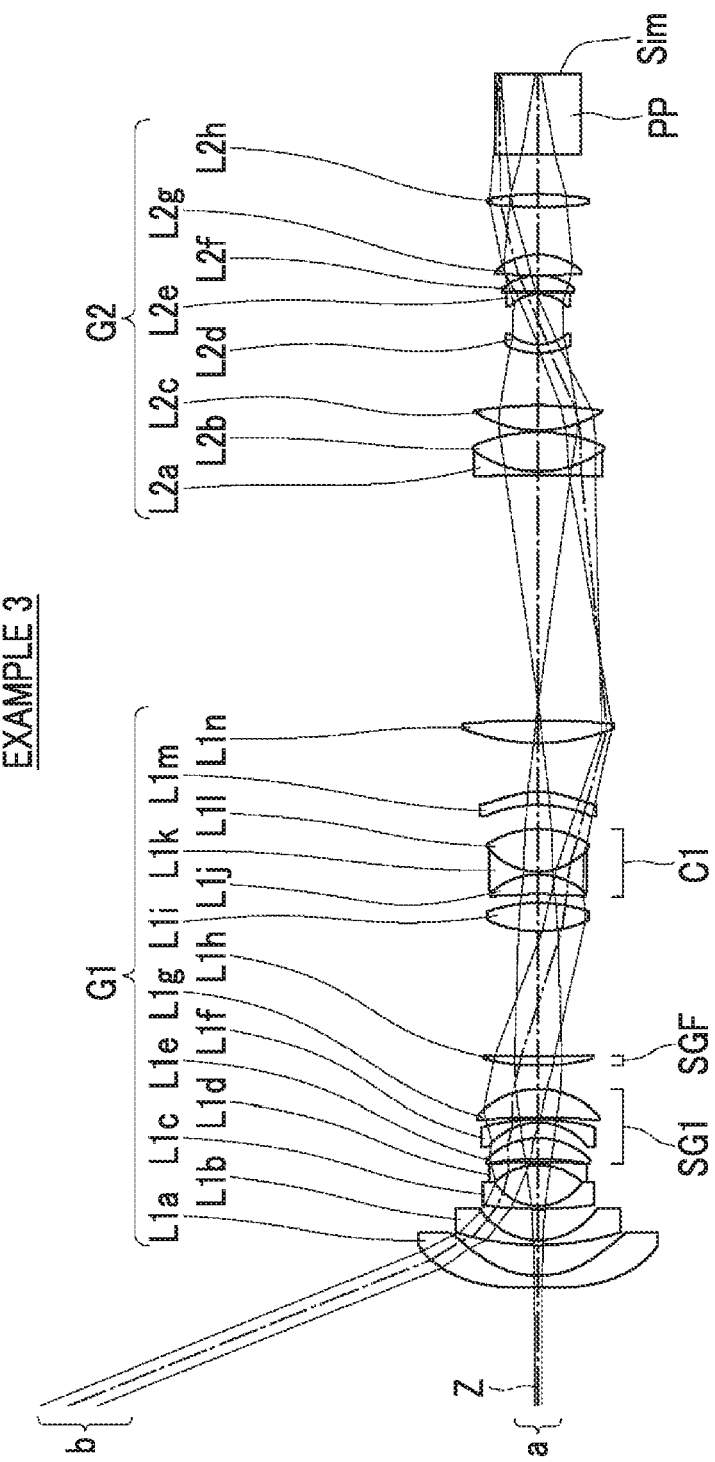
FIG. 3 is a cross-sectional view illustrating a lens configuration of an imaging lens of Example 3 of the present invention.

Next, numerical value examples of the imaging lens of the present invention will be described. First, an imaging lens of Example 1 will be described. FIG. 1 shows a cross-sectional view illustrating a lens configuration of the imaging lens of Example 1. In FIG. 1 and FIGS. 2 and 3 corresponding to Examples 2 and 3 described later, the left side is a magnified side, and the right side is a reduced side. In addition, FIGS. 1 to 3 show a state of being focused on the infinite object, and show an on-axis light flux a and a light flux b of the maximum angle of view together.

The imaging lens of Example 1 is composed of the first imaging optical system G1 composed of fourteen lenses, that is, lenses L1a to L1n and the second imaging optical system G2 composed of eight lenses, that is, lenses L2a to L2h, in order from the magnified side. In addition, the focus lens group SGF is composed of one lens L1h.

Table 1 shows basic lens data of the imaging lens of Example 1, Table 2 shows data relating to specifications, and Table 3 shows data relating to aspherical coefficients. In the following, the meanings of symbols in the tables will be described by taking an example of those in Example 1, but the same is basically true of Examples 2 and 3.

In the lens data of Table 1, the column of a surface number shows surface numbers sequentially increasing toward the reduced side with the surface of an element closest to the magnified side regarded as a first surface, the column of a curvature radius shows curvature radii of respective surfaces, and the column of a surface distance shows distances on the optical axis Z between the respective surfaces and the next surfaces. In addition, the column of n shows refractive indexes of respective optical elements at a d line (a wavelength of 587.6 nm (nanometer)), and the column of ν shows Abbe numbers of the respective optical elements at the d line (a wavelength of 587.6 nm (nanometer)). In addition, the sign of the curvature radius is set to be positive in a case where a surface shape is convex on the magnified side, and is set to be negative in a case where a surface shape is convex on the reduced side. The basic lens data also shows the optical member PP together.

The data relating to specifications of Table 2 shows values of a focal length f, an F-Number FNo., and the total angle of view 2ω(°).

In the lens data of Table 1, mark * is attached to the surface number of an aspherical surface, and the numerical values of a paraxial curvature radius are indicated as the curvature radius of the aspherical surface. The data relating to the aspherical coefficients of Table 3 indicates surface numbers of the aspherical surfaces and aspherical coefficients relating to these aspherical surfaces. "E±n" (n is an integer) in the numerical values of the aspherical coefficients of Table 3 means "×10$^{±n}$". The aspherical coefficients are values of respective coefficients KA and Am in an aspherical expression represented by the following expression.

$$Zd = C \cdot h^2 / \{1 + (1 - KA \cdot C^2 \cdot h^2)^{1/2}\} + \Sigma Am \cdot h^m$$

Here, Zd is an aspherical depth (length of a vertical line drawn from a point on an aspherical surface having a height h down to a plane perpendicular to the optical axis with which the vertex of the aspherical surface is in contact), h is a height (distance from the optical axis), C is a reciprocal of the paraxial curvature radius, KA and Am are aspherical coefficients, and Σ at an aspherical depth Zd means a total sum for m.

For basic lens data, data relating to specifications, and data relating to a changing surface distance, a degree is used as the unit of an angle, and mm (millimeter) is used as the unit of a length, but it is also possible to use other appropriate units since an optical system can be used even in a case where the optical system is magnified or reduced in proportion.

TABLE 1

EXAMPLE 1・LENS DATA (n AND ν ARE BASED ON d LINE)

| SURFACE NUMBER | CURVATURE RADIUS | SURFACE DISTANCE | n | ν |
|---|---|---|---|---|
| *1 | −48.4926 | 6.2002 | 1.53158 | 55.08 |
| *2 | −449.2226 | 15.9990 | | |
| 3 | 121.2137 | 2.5991 | 1.80518 | 25.46 |
| 4 | 33.3183 | 11.6117 | | |
| 5 | 88.6084 | 1.7991 | 1.59282 | 68.62 |
| 6 | 28.5937 | 21.0637 | | |
| 7 | −38.6690 | 1.4510 | 1.49700 | 81.61 |
| 8 | 219.0232 | 3.0849 | | |
| 9 | −162.9056 | 12.4594 | 1.72916 | 54.68 |
| 10 | −42.0949 | 6.5365 | | |
| 11 | −37.8099 | 3.1931 | 1.59282 | 68.62 |
| 12 | −308.0501 | 1.6869 | | |
| 13 | 594.1154 | 18.3699 | 1.65160 | 58.55 |
| 14 | −53.3711 | 6.0566 | | |
| 15 | 124.1465 | 5.4021 | 1.92286 | 20.88 |
| 16 | 843.3282 | 73.6239 | | |
| 17 | 82.2247 | 12.4292 | 1.48749 | 70.24 |
| 18 | −99.0895 | 6.4887 | | |
| 19 | −176.3947 | 12.2978 | 1.72916 | 54.68 |
| 20 | −35.7816 | 1.6991 | 1.80518 | 25.46 |
| 21 | 45.0376 | 23.0093 | 1.49700 | 81.61 |
| 22 | −50.5098 | 9.5947 | | |
| *23 | −45.7771 | 6.7990 | 1.58313 | 59.38 |
| *24 | −37.2443 | 38.4349 | | |
| 25 | 172.8351 | 13.0008 | 1.80518 | 25.46 |
| 26 | −267.5544 | 118.7890 | | |
| 27 | 15750.0279 | 6.0004 | 1.72151 | 29.23 |
| 28 | 64.0753 | 21.1627 | 1.51680 | 64.20 |
| 29 | −88.9712 | 15.4128 | | |
| 30 | 77.2348 | 12.4498 | 1.69680 | 55.53 |
| 31 | −226.8618 | 28.7730 | | |
| 32 | 36.8730 | 0.9954 | 1.68893 | 31.07 |
| 33 | 24.5222 | 24.8054 | | |
| 34 | −21.3632 | 0.9491 | 1.73800 | 32.26 |
| 35 | 444.5407 | 0.2000 | | |
| 36 | 1322.1158 | 8.2991 | 1.59282 | 68.62 |
| 37 | −29.8225 | 0.1990 | | |
| 38 | 682.2252 | 10.4991 | 1.49700 | 81.61 |
| 39 | −35.7914 | 23.9097 | | |
| 40 | 137.6836 | 6.7991 | 1.92286 | 20.88 |
| 41 | −192.9054 | 21.2690 | | |
| 42 | ∞ | 42.6940 | 1.51633 | 64.14 |
| 43 | ∞ | | | |

TABLE 2

EXAMPLE 1・SPECIFICATION (d LINE)

| |f| | 8.14 |
|---|---|
| FNo. | 1.89 |
| 2ω[°] | 137.0 |

TABLE 3

EXAMPLE 1 ASPHERICAL COEFFICIENT

| SURFACE NUMBER | 1 | 2 | 23 | 24 |
|---|---|---|---|---|
| KA | 4.7389090E−01 | −1.5999956E+00 | −1.3409349E+00 | −1.0768070E+00 |
| A3 | 1.2033129E−03 | 1.5389718E−03 | 5.3804722E−05 | 3.4650787E−05 |
| A4 | −2.7182578E−05 | −7.8378708E−05 | 2.4409327E−06 | 8.8757471E−06 |
| A5 | −2.4970042E−06 | 1.4054005E−06 | −4.2475731E−07 | −1.3774039E−06 |
| A6 | 1.6184806E−07 | −4.7077089E−08 | 7.2168147E−08 | 1.5892915E−07 |
| A7 | −9.5130258E−10 | 4.5030417E−09 | −3.6858507E−09 | −6.5216503E−09 |
| A8 | −1.5000665E−10 | −4.7172479E−11 | −1.0647476E−10 | −2.0986493E−10 |
| A9 | 3.0304311E−12 | −5.4243296E−12 | 1.2584491E−11 | 2.7278845E−11 |
| A10 | 6.3970435E−14 | 7.4885045E−14 | −7.3755652E−14 | −5.8756713E−13 |

TABLE 3-continued

EXAMPLE 1 ASPHERICAL COEFFICIENT

| SURFACE NUMBER | 1 | 2 | 23 | 24 |
|---|---|---|---|---|
| A11 | −2.3172076E−15 | 4.2481517E−15 | −1.7188186E−14 | −2.8777137E−14 |
| A12 | −8.1214576E−18 | −6.6502567E−17 | 3.0812973E−16 | 1.7753126E−15 |
| A13 | 8.9167510E−19 | −1.7728178E−18 | 1.2375231E−17 | −1.1478835E−17 |
| A14 | −3.2130984E−21 | 2.5194051E−20 | −3.2719138E−19 | −1.7093400E−18 |
| A15 | −1.8988201E−22 | 6.0896317E−22 | −4.8309791E−21 | 4.6237369E−20 |
| A16 | 1.4364312E−24 | −9.7268968E−24 | 1.7445324E−22 | 4.9236128E−22 |
| A17 | 2.1405975E−26 | −2.8854020E−26 | 9.4770172E−25 | −3.4310897E−23 |
| A18 | −2.1856781E−28 | 1.6969047E−28 | −4.8049001E−26 | 1.9286105E−25 |
| A19 | −1.0004767E−30 | 1.4892222E−29 | −7.1315541E−29 | 8.5177819E−27 |
| A20 | 1.2239178E−32 | −1.0866246E−31 | 5.4427362E−30 | −1.0677720E−28 |

Figure 4:
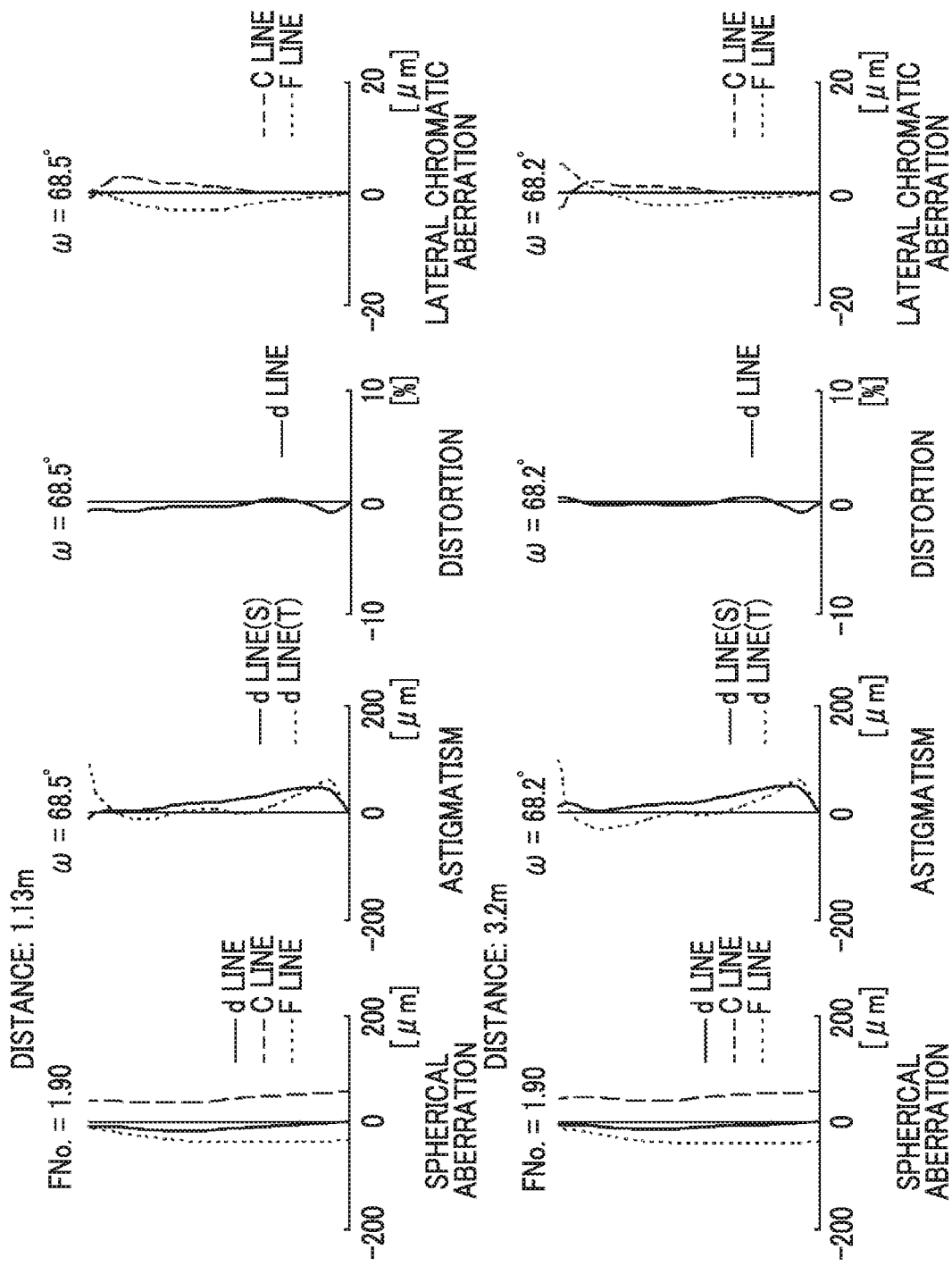
FIG. 4 is a diagram of aberrations of the imaging lens of Example 1 of the present invention.

FIG. 4 shows a diagram of aberrations of the imaging lens of Example 1. Meanwhile, spherical aberration, astigmatism, distortion, and lateral chromatic aberration during focusing on an object at a distance of 1.13 m (meter) from a surface closest to the magnified side are shown in order from the upper left side of FIG. 4, and spherical aberration, astigmatism, distortion, and lateral chromatic aberration during focusing on an object at a distance of 3.2 m (meter) from the surface closest to the magnified side are shown in order from the lower left side of FIG. 4. The diagram of aberrations indicating spherical aberration, astigmatism, and distortion shows aberrations in which the d line (a wavelength of 587.6 nm (nanometer)) is used as a reference wavelength. In the spherical aberration diagram, aberrations relating to the d line (a wavelength of 587.6 nm (nanometer)), a C line (a wavelength of 656.3 nm (nanometer)), and an F line (a wavelength of 486.1 nm (nanometer)) are shown by a solid line, a long dashed line, and a short dashed line. In the astigmatism diagram, aberrations in a sagittal direction and a tangential direction are shown by a solid line and a short dashed line, respectively. In the lateral chromatic aberration diagram, aberrations relating to the C line (a wavelength of 656.3 nm (nanometer)) and the F line (a wavelength of 486.1 nm (nanometer)) are shown by a long dashed line and a short dashed line, respectively. Meanwhile, FNo. in the spherical aberration diagram means an F-Number, and ω in the other aberration diagrams means a half angle of view.

Figure 5:
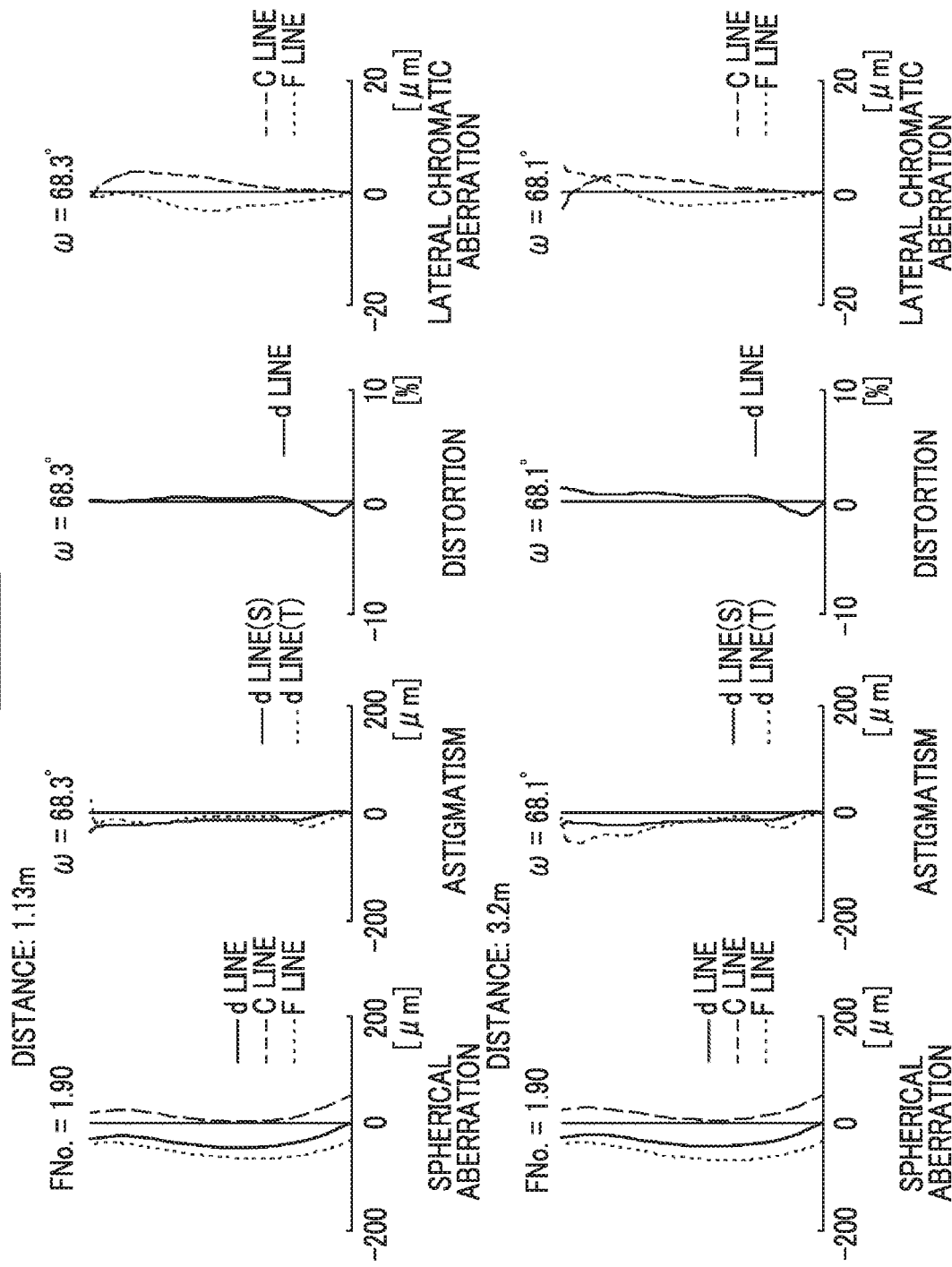
FIG. 5 is a diagram of aberrations of the imaging lens of Example 2 of the present invention.

Next, an imaging lens of Example 2 will be described. FIG. 2 shows a cross-sectional view illustrating a lens configuration of the imaging lens of Example 2. The group configuration of the imaging lens of Example 2 is the same as that of the imaging lens of Example 1. In addition, Table 4 shows basic lens data of the imaging lens of Example 2, Table 5 shows data relating to specifications, Table 6 shows data relating to aspherical coefficients, and FIG. 5 shows a diagram of aberrations.

TABLE 4

EXAMPLE 2•LENS DATA (n AND ν ARE BASED ON d LINE)

| SURFACE NUMBER | CURVATURE RADIUS | SURFACE DISTANCE | n | ν |
|---|---|---|---|---|
| *1 | −50.0846 | 6.1844 | 1.53158 | 55.08 |
| *2 | −66277735.5422 | 15.9990 | | |
| 3 | 112.3405 | 2.6071 | 1.80518 | 25.46 |
| 4 | 27.3446 | 18.2944 | | |
| 5 | 122.1697 | 1.6491 | 1.59282 | 68.62 |
| 6 | 34.6524 | 19.3179 | | |
| 7 | −32.3275 | 1.4510 | 1.49700 | 81.61 |
| 8 | −1614.6998 | 2.5051 | | |
| 9 | −131.9557 | 11.2290 | 1.80400 | 46.53 |
| 10 | −39.0545 | 7.4431 | | |
| 11 | −34.9439 | 1.8628 | 1.59282 | 68.62 |
| 12 | −117.9694 | 1.0759 | | |
| 13 | −293.0357 | 14.6459 | 1.62299 | 58.16 |
| 14 | −45.0313 | 2.6111 | | |
| 15 | 115.3867 | 5.1235 | 1.92286 | 20.88 |
| 16 | 512.3511 | 76.2604 | | |
| 17 | 62.4121 | 11.9991 | 1.48749 | 70.24 |
| 18 | −89.2805 | 4.6139 | | |
| 19 | −284.2455 | 11.0091 | 1.67790 | 55.34 |
| 20 | −38.0280 | 1.5009 | 1.80518 | 25.46 |
| 21 | 34.7907 | 22.5090 | 1.49700 | 81.61 |
| 22 | −55.8399 | 13.0404 | | |
| *23 | −54.6938 | 6.7990 | 1.58313 | 59.38 |
| *24 | −41.3244 | 30.5165 | | |
| 25 | 104.3124 | 10.7991 | 1.80518 | 25.46 |
| 26 | −1103.7580 | 118.5767 | | |
| 27 | 446.7084 | 2.1507 | 1.72151 | 29.23 |
| 28 | 58.7486 | 21.0200 | 1.51680 | 64.20 |
| 29 | −82.5776 | 17.0415 | | |
| 30 | 59.5839 | 11.9997 | 1.61800 | 63.33 |
| 31 | −286.9645 | 18.2421 | | |
| 32 | 38.9391 | 3.9112 | 1.68893 | 31.07 |
| 33 | 24.0257 | 25.4323 | | |
| 34 | −21.1975 | 0.9510 | 1.73800 | 32.26 |
| 35 | 263.2259 | 0.2008 | | |
| 36 | 418.6492 | 8.4991 | 1.59282 | 68.62 |
| 37 | −30.4689 | 0.1990 | | |
| 38 | −4993.3470 | 14.4410 | 1.49700 | 81.61 |
| 39 | −36.0078 | 23.0191 | | |
| 40 | 125.6601 | 6.8000 | 1.92286 | 20.88 |
| 41 | −217.8092 | 21.2690 | | |
| 42 | ∞ | 42.6940 | 1.51633 | 64.14 |
| 43 | ∞ | | | |

TABLE 5

EXAMPLE 2•SPECIFICATION (d LINE)

| |f| | 8.13 |
|---|---|
| FNo. | 1.89 |
| 2ω[°] | 136.6 |

TABLE 6

EXAMPLE 2 ASPHERICAL COEFFICIENT

| SURFACE NUMBER | 1 | 2 | 23 | 24 |
|---|---|---|---|---|
| KA | 4.4795551E−01 | 1.5000090E+00 | −4.1548632E−01 | −1.3493368E+00 |
| A3 | 1.2607133E−03 | 1.6413539E−03 | 1.0822597E−05 | −6.6437130E−05 |
| A4 | −2.1718430E−05 | −8.2913849E−05 | 1.0361378E−05 | 2.9358090E−05 |
| A5 | −2.6234339E−06 | 3.4114968E−06 | −8.6728832E−07 | −3.2849813E−06 |
| A6 | 1.4304636E−07 | −2.3841913E−07 | 8.1268458E−08 | 2.5413547E−07 |
| A7 | −3.6094209E−10 | 9.3159450E−09 | −1.1806207E−09 | −5.3318929E−09 |
| A8 | −1.3242084E−10 | 1.2151485E−10 | −2.3403049E−10 | −6.0210170E−10 |
| A9 | 2.1961600E−12 | −1.4246810E−11 | 7.4843710E−12 | 4.8445929E−11 |
| A10 | 5.8097335E−14 | −2.7048770E−14 | 2.9657866E−13 | −8.6097750E−13 |
| A11 | −1.7246111E−15 | 1.3788681E−14 | −1.2236223E−14 | −7.2735921E−14 |
| A12 | −9.5194866E−18 | −6.8283528E−17 | −2.4785762E−16 | 4.5626252E−15 |
| A13 | 6.5726828E−19 | −7.0274057E−18 | 1.0542440E−17 | −2.0267024E−17 |
| A14 | −1.4919729E−21 | 3.0306815E−20 | 1.5819247E−19 | −5.9993302E−18 |
| A15 | −1.3730387E−22 | 3.1334947E−21 | −5.1844898E−21 | 1.5211147E−19 |
| A16 | 8.8585495E−25 | −3.3819083E−23 | −6.8091631E−23 | 2.6728572E−21 |
| A17 | 1.5135518E−26 | −1.3614357E−25 | 1.3987987E−24 | −1.4331769E−22 |
| A18 | −1.3883387E−28 | −3.4860213E−27 | 1.4742009E−26 | 4.8164596E−25 |
| A19 | −6.9100103E−31 | 1.3308595E−28 | −1.6678473E−28 | 4.3955491E−26 |
| A20 | 7.7452078E−33 | −8.0139772E−31 | −9.1136202E−31 | −5.1789964E−28 |

Figure 6:
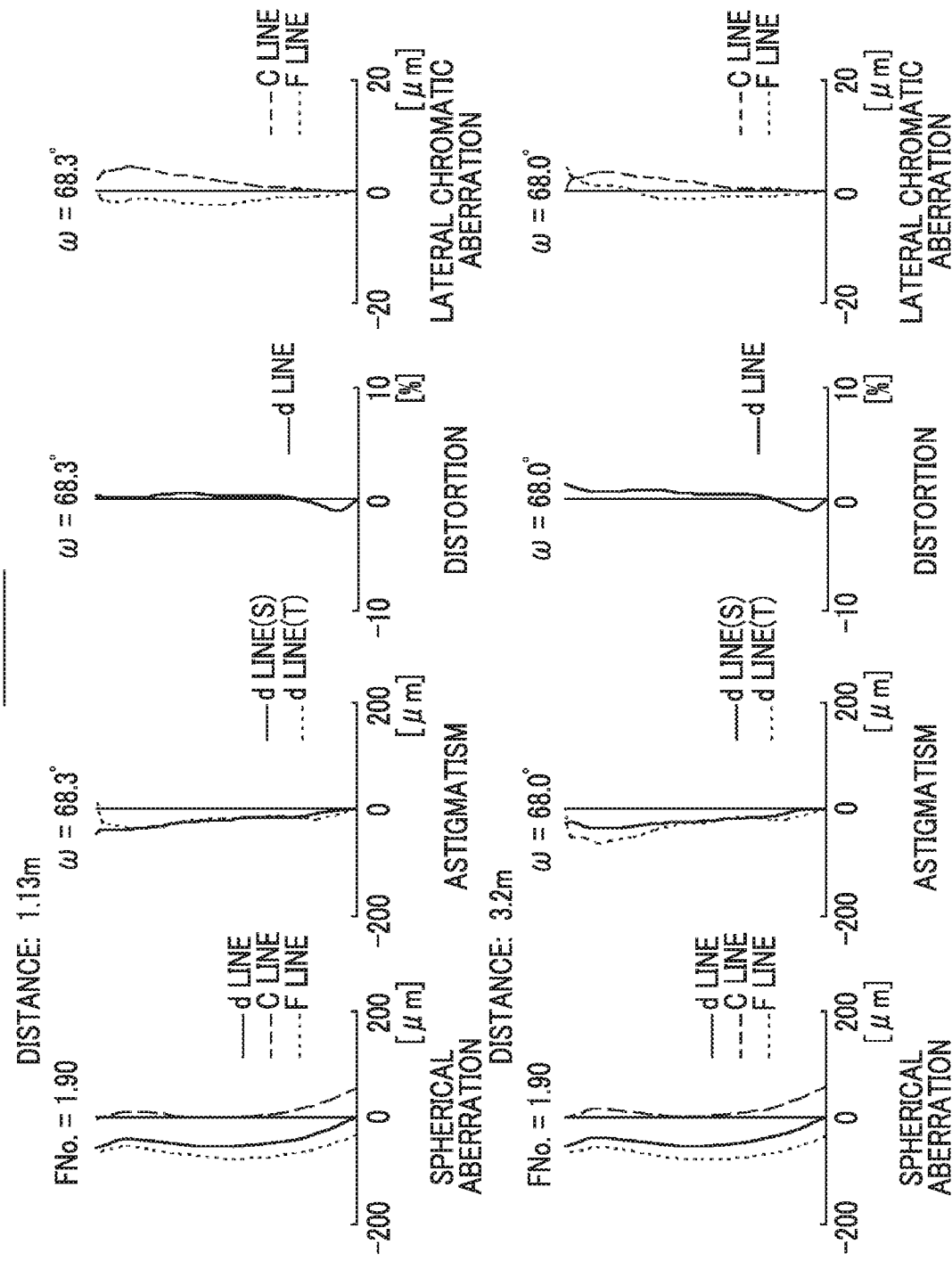
FIG. 6 is a diagram of aberrations of the imaging lens of Example 3 of the present invention.

Next, an imaging lens of Example 3 will be described. FIG. 3 shows a cross-sectional view illustrating a lens configuration of the imaging lens of Example 3. The group configuration of the imaging lens of Example 3 is the same as that of the imaging lens of Example 1. In addition, Table 7 shows basic lens data of the imaging lens of Example 3, Table 8 shows data relating to specifications, Table 9 shows data relating to aspherical coefficients, and FIG. 6 shows a diagram of aberrations.

TABLE 7

EXAMPLE 3·LENS DATA (n AND ν ARE BASED ON d LINE)

| SURFACE NUMBER | CURVATURE RADIUS | SURFACE DISTANCE | n | ν |
|---|---|---|---|---|
| *1 | −49.3520 | 6.2009 | 1.53158 | 55.08 |
| *2 | −589.3033 | 15.9991 | | |
| 3 | 147.1289 | 2.5990 | 1.80518 | 25.46 |
| 4 | 38.0779 | 16.5008 | | |
| 5 | 216.0961 | 1.6500 | 1.59282 | 68.62 |
| 6 | 28.4646 | 21.5487 | | |
| 7 | −34.7700 | 1.4508 | 1.49700 | 81.61 |
| 8 | −598.8344 | 1.7823 | | |
| 9 | −145.0858 | 10.9998 | 1.77250 | 49.60 |
| 10 | −40.2750 | 8.2014 | | |
| 11 | −34.1780 | 1.7801 | 1.59282 | 68.62 |
| 12 | −109.9796 | 1.0440 | | |
| 13 | −330.1369 | 14.5008 | 1.62299 | 58.16 |
| 14 | −45.3179 | 12.3860 | | |
| 15 | 121.3891 | 4.9991 | 1.92286 | 20.88 |
| 16 | 704.1801 | 66.0941 | | |
| 17 | 65.2561 | 15.0069 | 1.48749 | 70.24 |
| 18 | −82.8908 | 4.5535 | | |
| 19 | −261.2348 | 10.5090 | 1.65160 | 58.55 |
| 20 | −37.9935 | 1.4991 | 1.80518 | 25.46 |
| 21 | 34.7270 | 22.5091 | 1.49700 | 81.61 |

TABLE 7-continued

EXAMPLE 3·LENS DATA (n AND ν ARE BASED ON d LINE)

| SURFACE NUMBER | CURVATURE RADIUS | SURFACE DISTANCE | n | ν |
|---|---|---|---|---|
| 22 | −50.6759 | 12.9627 | | |
| *23 | −52.0756 | 6.7991 | 1.58313 | 59.38 |
| *24 | −39.5285 | 25.8325 | | |
| 25 | 112.7138 | 11.9991 | 1.80518 | 25.46 |
| 26 | −441.1330 | 129.5346 | | |
| 27 | −1232.2797 | 2.1500 | 1.72047 | 34.71 |
| 28 | 59.9312 | 20.8191 | 1.51680 | 64.20 |
| 29 | −85.4862 | 0.9991 | | |
| 30 | 65.1706 | 13.0012 | 1.61800 | 63.33 |
| 31 | −229.6473 | 27.2802 | | |
| 32 | 38.0523 | 4.6305 | 1.71736 | 29.52 |
| 33 | 24.5564 | 26.5675 | | |
| 34 | −21.0534 | 0.9491 | 1.73800 | 32.26 |
| 35 | 695.5711 | 0.4991 | | |
| 36 | −509.1829 | 8.4996 | 1.59282 | 68.62 |
| 37 | −30.6166 | 0.1993 | | |
| 38 | 824.6118 | 10.7991 | 1.49700 | 81.61 |
| 39 | −34.9526 | 25.0879 | | |
| 40 | 200.0595 | 6.7991 | 1.92286 | 20.88 |
| 41 | −154.1413 | 21.2690 | | |
| 42 | ∞ | 42.6940 | 1.51633 | 64.14 |
| 43 | ∞ | | | |

TABLE 8

EXAMPLE 3·SPECIFICATION (d LINE)

| |f| | 8.16 |
|---|---|
| FNo. | 1.89 |
| 2ω[°] | 136.6 |

TABLE 9

EXAMPLE 3 ASPHERICAL COEFFICIENT

| SURFACE NUMBER | 1 | 2 | 23 | 24 |
|---|---|---|---|---|
| KA | 4.1000905E−01 | 1.4999954E+00 | −1.0295965E+00 | −2.3403084E−01 |
| A3 | 1.0024299E−03 | 1.2605711E−03 | −6.0237058E−06 | −7.5963198E−05 |
| A4 | −1.5024146E−05 | −5.3045762E−05 | 1.2980808E−05 | 3.5041616E−05 |

TABLE 9-continued

EXAMPLE 3 ASPHERICAL COEFFICIENT

| SURFACE NUMBER | 1 | 2 | 23 | 24 |
|---|---|---|---|---|
| A5 | −1.9167614E−06 | 9.5896390E−07 | −1.1048679E−06 | −3.7737154E−06 |
| A6 | 1.0203374E−07 | −4.4276228E−08 | 9.0087625E−08 | 2.8065918E−07 |
| A7 | −4.2568831E−10 | 2.8806096E−09 | −1.7688263E−09 | −3.6723686E−09 |
| A8 | −8.4148099E−11 | −1.3460921E−11 | −2.6678792E−10 | −9.3326498E−10 |
| A9 | 1.5475494E−12 | −3.1847352E−12 | 1.2121146E−11 | 5.4743621E−11 |
| A10 | 3.1519899E−14 | 3.4902474E−14 | 2.5522414E−13 | 2.2639224E−13 |
| A11 | −1.0719992E−15 | 2.1152930E−15 | −2.1571165E−14 | −1.2012170E−13 |
| A12 | −3.2832655E−18 | −3.0362462E−17 | −1.2498451E−17 | 3.0623695E−15 |
| A13 | 3.6711736E−19 | −7.4949034E−19 | 1.9233570E−17 | 9.3072831E−17 |
| A14 | −1.3712002E−21 | 1.0889694E−20 | −1.6956894E−19 | −5.5557182E−18 |
| A15 | −6.9189687E−23 | 2.0437725E−22 | −9.1019012E−21 | 1.8553936E−20 |
| A16 | 5.2031897E−25 | −3.3116307E−24 | 1.5112413E−22 | 3.7494435E−21 |
| A17 | 6.8843600E−27 | −1.0544676E−26 | 2.1314245E−24 | −6.4679350E−23 |
| A18 | −6.9413262E−29 | 1.3689396E−28 | −5.9102745E−26 | −6.7845507E−25 |
| A19 | −2.8342047E−31 | 3.1777434E−30 | −1.9015014E−28 | 2.5450917E−26 |
| A20 | 3.4280103E−33 | −2.5212082E−32 | 9.2181084E−30 | −1.6529642E−28 |

Table 10 shows values corresponding to Conditional Expressions (1) to (25) of the imaging lenses of Examples 1 to 3. Meanwhile, the d line is used as a reference wavelength in all the examples, and values shown in the following Table 10 are equivalent to those at this reference wavelength.

TABLE 10

| EXPRESSION NUMBER | CONDITIONAL EXPRESSION | EXAMPLE 1 | EXAMPLE 2 | EXAMPLE 3 |
|---|---|---|---|---|
| (1) | f4/fn1 | −3.941 | −4.087 | −4.010 |
| (2) | fa/fn2 | 0.180 | 0.167 | 0.159 |
| (3) | h2/h1 | 5.905 | 6.193 | 5.820 |
| (4) | f3/f1 | 1.019 | 1.276 | 1.198 |
| (5) | vdc1 − vdc2 | 29.220 | 29.880 | 33.090 |
| (6) | vdc2 − vdc3 | −56.150 | −56.150 | −56.150 |
| (7) | |f|/fc | −0.010 | −0.031 | −0.027 |
| (8) | |f|/fc1 | 0.137 | 0.128 | 0.122 |
| (9) | |f|/fc2 | −0.332 | −0.364 | −0.365 |
| (10) | |f|/fc3 | 0.156 | 0.173 | 0.180 |
| (11) | |f|/fa | 0.499 | 0.539 | 0.564 |
| (12) | |f|/fb | 0.065 | 0.060 | 0.060 |
| (13) | f4/f1 | 2.107 | 2.450 | 2.293 |
| (14) | fa/f1 | 0.219 | 0.231 | 0.210 |
| (15) | f4/f3 | 2.068 | 1.920 | 1.914 |
| (16) | fa/f3 | 0.215 | 0.181 | 0.175 |
| (17) | f4/f12 | 0.066 | 0.680 | 0.565 |
| (18) | fa/f12 | 0.007 | 0.064 | 0.052 |
| (19) | f4/f23 | 0.321 | 0.321 | 0.329 |
| (20) | fa/f23 | 0.033 | 0.030 | 0.030 |
| (21) | f4/f13 | 2.014 | 2.362 | 2.241 |
| (22) | fa/f13 | 0.209 | 0.222 | 0.205 |
| (23) | |f|/f13 | 0.104 | 0.120 | 0.115 |
| (24) | |f|/f12 | 0.003 | 0.035 | 0.029 |
| (25) | |f|/f23 | 0.017 | 0.016 | 0.017 |

From the above-mentioned data, it can be understood that the imaging lenses of Examples 1 to 3 all satisfy Conditional Expressions (1) to (25), and are imaging lenses in which the total angle of view is as wide an angle as 120° or more, the F-Number is small, and the distance fluctuation of aberration is small.

Figure 7:
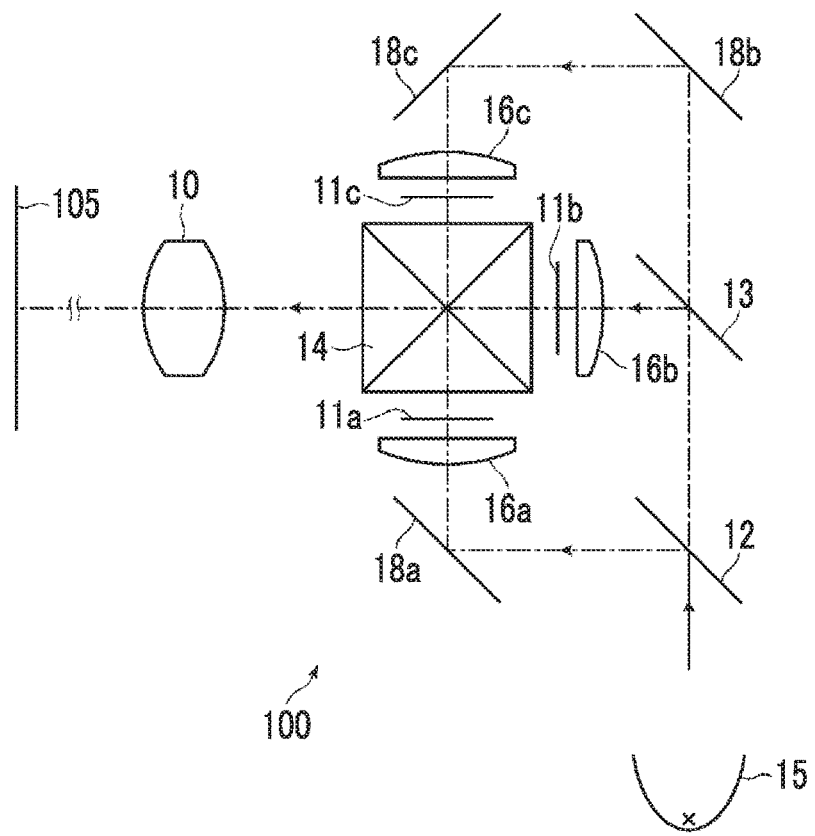
FIG. 7 is a schematic configuration diagram of a projection-type display apparatus according to an embodiment of the present invention.

Next, a projection-type display apparatus according to an embodiment of the present invention will be described. FIG. 7 is a schematic configuration diagram of a projection-type display apparatus according to the embodiment of the present invention. A projection-type display apparatus 100 shown in FIG. 7 includes an imaging lens 10 according to an embodiment of the present invention, a light source 15, transmission-type display devices 11a to 11c as light valves corresponding to respective beams of colored light, dichroic mirrors 12 and 13 for color decomposition, a cross dichroic prism 14 for color synthesis, capacitor lenses 16a to 16c, and total reflection mirrors 18a to 18c for deflecting an optical path. Meanwhile, in FIG. 7, the imaging lens 10 is schematically shown. In addition, an integrator is disposed between the light source 15 and the dichroic mirror 12, but is not shown in FIG. 7.

White light from the light source 15 is decomposed into three colored light fluxes (G light, B light, and R light) by the dichroic mirrors 12 and 13. The decomposed light fluxes are then incident on the transmission-type display devices 11a to 11c corresponding to the respective colored light fluxes through the capacitor lenses 16a to 16c, respectively, and are optically modulated. The modulated light fluxes are color-synthesized by the cross dichroic prism 14, and then are incident on the imaging lens 10. The imaging lens 10 projects an optical image of light optically modulated by the transmission-type display devices 11a to 11c onto a screen 105.

Figure 8:
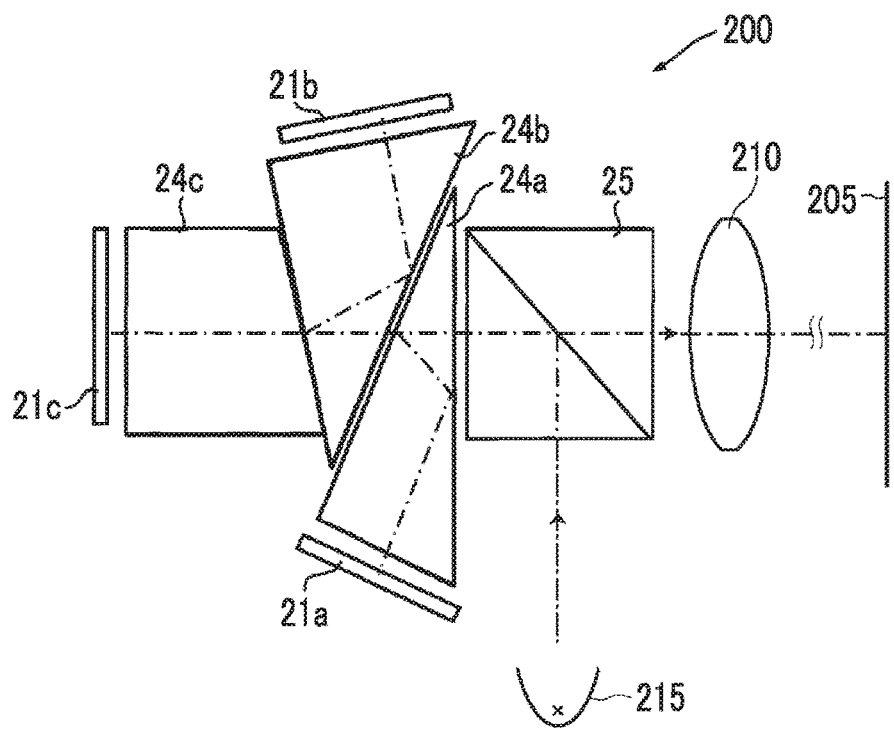
FIG. 8 is a schematic configuration diagram of a projection-type display apparatus according to another embodiment of the present invention.

FIG. 8 is a schematic configuration diagram of a projection-type display apparatus according to another embodiment of the present invention. A projection-type display apparatus 200 shown in FIG. 8 includes an imaging lens 210 according to the embodiment of the present invention, a light source 215, DMDs 21a to 21c as light valves corresponding to respective beams of colored light, total internal reflection (TIR) prisms 24a to 24c for color decomposition and color synthesis, and a polarization separation prism 25 that separates illumination light and projected light. Meanwhile, in FIG. 8, the imaging lens 210 is schematically shown. In addition, an integrator is disposed between the light source 215 and the polarization separation prism 25, but is not shown in FIG. 8.

White light from the light source 215 is reflected from a reflecting surface inside the polarization separation prism 25, and then is decomposed into three colored light fluxes (G light, B light, and R light) by the TIR prisms 24a to 24c. The respective colored light fluxes after the decomposition are incident on the DMDs 21a to 21c corresponding thereto and are optically modulated. The modulated light fluxes travel through the TIR prisms 24a to 24c again in an opposite direction and are color-synthesized. The synthesized light passes through the polarization separation prism 25 and is incident on the imaging lens 210. The imaging lens 210 projects an optical image of light optically modulated by the DMDs 21a to 21c onto a screen 205.

Figure 9:
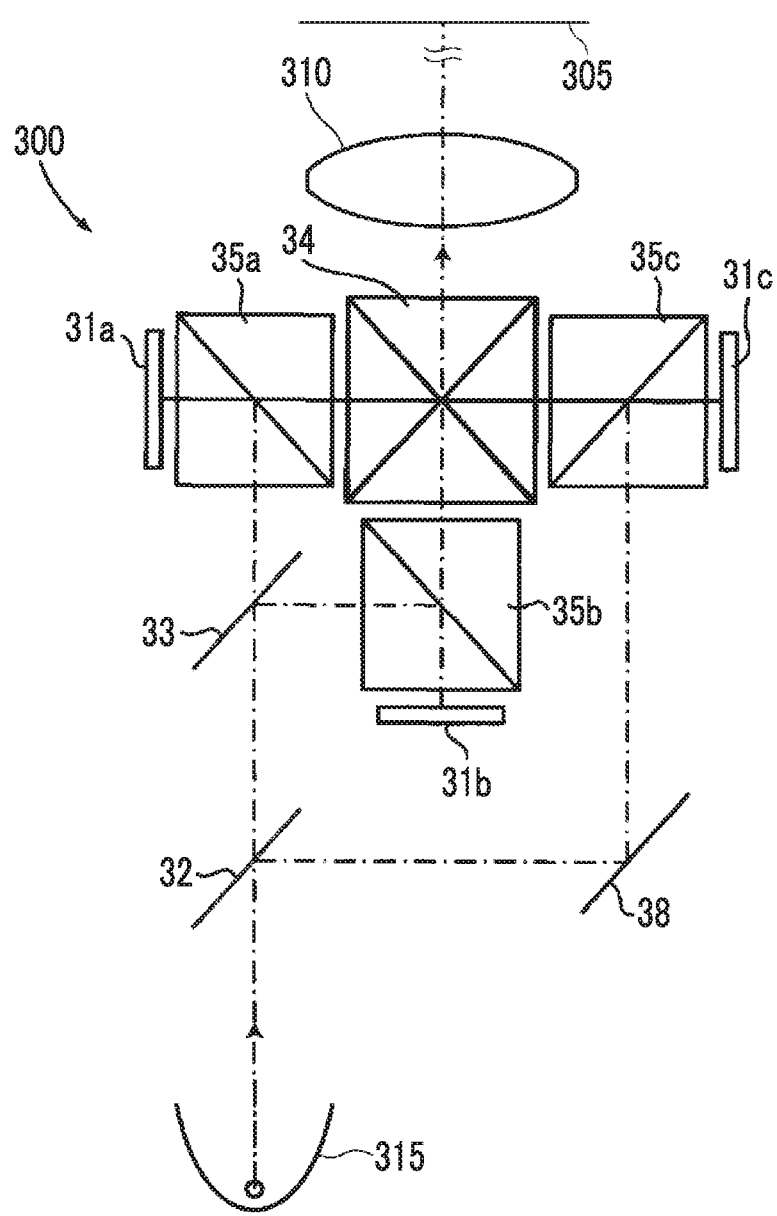
FIG. 9 is a schematic configuration diagram of a projection-type display apparatus according to still another embodiment of the present invention.

FIG. 9 is a schematic configuration diagram of a projection-type display apparatus according to still another embodiment of the present invention. A projection-type display apparatus 300 shown in FIG. 9 includes an imaging lens 310 according to the embodiment of the present invention, a light source 315, reflection-type display devices 31a to 31c as light valves corresponding to respective beams of colored light, dichroic mirrors 32 and 33 for color separation, a cross dichroic prism 34 for color synthesis, a total reflection mirror 38 for optical path deflection, and polarization separation prisms 35a to 35c. Meanwhile, in FIG. 9, the imaging lens 310 is schematically shown. In addition, an integrator is disposed between the light source 315 and the dichroic mirror 32, but is not shown in FIG. 9.

White light from light source 315 is decomposed into three colored light fluxes (G light, B light, and R light) by the dichroic mirrors 32 and 33. The respective colored light fluxes after the decomposition are incident on the reflection-type display devices 31a to 31c corresponding to the respective colored light fluxes through the polarization separation prisms 35a to 35c, respectively, and are optically modulated. The modulated light fluxes are color-synthesized by the cross dichroic prism 34, and then are incident on the imaging lens 310. The imaging lens 310 projects an optical image of light optically modulated by the reflection-type display devices 31a to 31c onto a screen 305.

Figure 10:
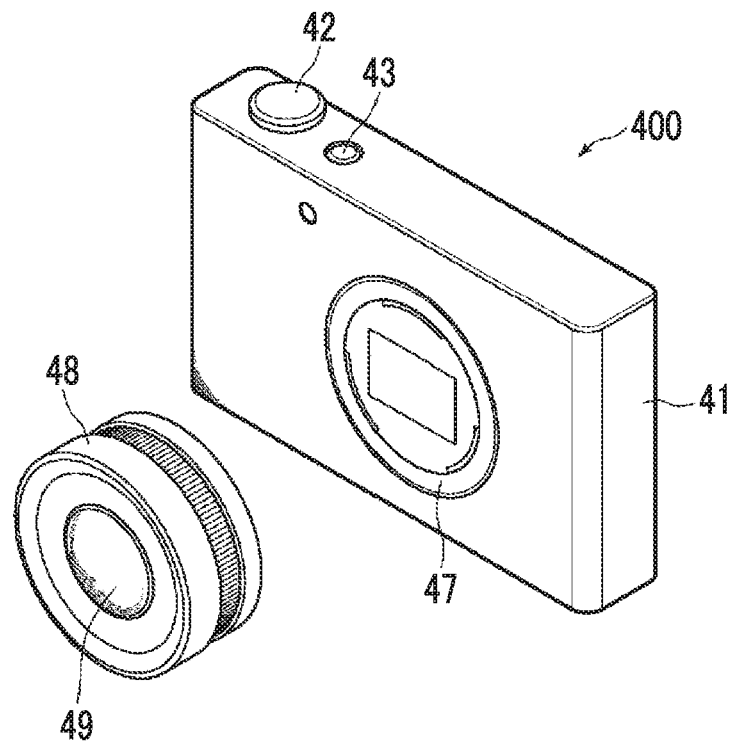
FIG. 10 is a perspective view of the front side of an imaging apparatus according to an embodiment of the present invention.
Figure 11:
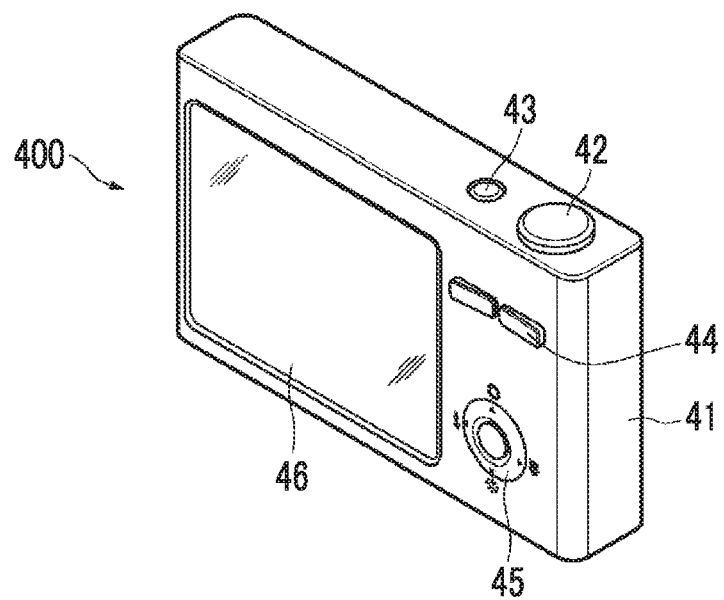
FIG. 11 is a perspective view of the rear surface side of the imaging apparatus shown in FIG. 10.

FIGS. 10 and 11 are appearance diagrams of a camera 400 which is an imaging apparatus of an embodiment of the present invention. FIG. 10 shows a perspective view when the camera 400 is seen from the front side, and FIG. 11 is a perspective view when the camera 400 seen from the rear surface side. The camera 400 is a single-lens digital camera, having no reflex finder, which has an interchangeable lens 48 detachably mounted therein. The interchangeable lens 48 has an imaging lens 49 which is an optical system according to the embodiment of the present invention housed within a lens barrel.

This camera 400 includes a camera body 41, and is provided with a shutter button 42 and a power button 43 on the upper surface of the camera body 41. In addition, operating portions 44 and 45 and a display portion 46 are provided on the rear surface of the camera body 41. The display portion 46 is used for displaying a captured image or an image within an angle of view before image capture.

An imaging aperture on which light from an imaging target is incident is provided on the front central portion of the camera body 41, a mount 47 is provided at a position corresponding to the imaging aperture, and the interchangeable lens 48 is mounted onto the camera body 41 through the mount 47.

The camera body 41 is provided therein with an imaging element (not shown) such as a charge coupled device (CCD) or a complementary metal oxide semiconductor (CMOS) that outputs an imaging signal according to a subject image formed by the interchangeable lens 48, a signal processing circuit that processes the imaging signal which is output from the imaging element to generate an image, a recording medium for recording the generated image, and the like. In this camera 400, a still image or a moving image can be captured by pressing the shutter button 42, and image data obtained by this image capture is recorded in the recording medium.

Hereinbefore, the present invention has been described through the embodiment and the examples, but the imaging lenses of the present invention are not limited to those of the above examples, and can be variously modified. For example, it is possible to appropriately change the curvature radius, the surface distance, the refractive index, and the Abbe number of each lens.

In addition, the projection-type display apparatuses of the present invention are also not limited to the above configurations. For example, the light valves which are used and the optical members which are used for light flux separation or light flux synthesis are not limited to the above configurations, and can be modified in various forms.

In addition, the imaging apparatus of the present invention is also not limited to the above configuration, and can be applied to, for example, a single-lens reflex camera, a film camera, a video camera, and the like.

EXPLANATION OF REFERENCES

10, 210, 310: imaging lens
11a to 11c: transmission-type display device
12, 13, 32, 33: dichroic mirror
14, 34: cross dichroic prism
15, 215, 315: light source
16a to 16c: capacitor lens
18a to 18c, 38: total reflection mirror
21a to 21c: DMD
24a to 24c: TIR prism
25, 35a to 35c: polarization separation prism
31a to 31c: reflection-type display device
41: camera body
42: shutter button
43: power button
44, 45: operating portion
46: display portion
47: mount
48: interchangeable lens
49: imaging lens
100, 200, 300: projection-type display apparatus
105, 205, 305: screen
400: camera
C1: cemented lens
G1: first imaging optical system
G2: second imaging optical system
L1a to L2h: lens
PP: optical member
SG1: first sub-lens group
SGF: focus lens group
Sim: image display surface
a: on-axis light flux
b: light flux of maximum angle of view
Z: optical axis

What is claimed is:

1. An imaging lens comprising, in order from a magnified side:
    a first imaging optical system that forms an intermediate image at a position conjugate to a magnified-side imaging surface;
    a second imaging optical system that re-forms the intermediate image on a reduced-side imaging surface,
    wherein the first imaging optical system includes at least four consecutive negative lenses, a first sub-lens group consisting of a positive lens, a negative lens, and a positive lens in order from the magnified side, and a focus lens group adjacent to a reduced side of the first sub-lens group, in order from a position closest to the magnified side, and
    only the focus lens group moves along an optical axis during focusing.

2. The imaging lens according to claim 1,
wherein in a case where a focal length of the focus lens group is set to f4, and a composite focal length from a negative lens of the first imaging optical system closest to the magnified side to a positive lens of the first sub-lens group on the reduced side is set to fn1, the following Conditional Expression (1) is satisfied.

$$-4.8 < f4/fn1 < -3 \quad (1)$$

3. The imaging lens according to claim 2,
wherein the following Conditional Expression (1-1) is satisfied.

$$-4.5 < f4/fn1 < -3.3 \quad (1\text{-}1)$$

4. The imaging lens according to claim 1,
wherein in a case where a focal length of the first imaging optical system is set to fa, and a composite focal length from a negative lens of the first imaging optical system closest to the magnified side to a lens of the focus lens group closest to the reduced side is set to fn2, the following Conditional Expression (2) is satisfied.

$$0.1 < fa/fn2 < 0.26 \quad (2)$$

5. The imaging lens according to claim 4,
wherein the following Conditional Expression (2-1) is satisfied.

$$0.12 < fa/fn2 < 0.24 \quad (2\text{-}1)$$

6. The imaging lens according to claim 1,
wherein in a case where a height of a paraxial on-axis light ray on a surface on the reduced side of a positive lens of the first sub-lens group on the reduced side is set to h2, and a height of a paraxial on-axis light ray on a surface on the magnified side of a negative lens of the first imaging optical system closest to the magnified side is set to h1, the following Conditional Expression (3) is satisfied.

$$4 < h2/h1 < 7.5 \quad (3)$$

7. The imaging lens according to claim 6,
wherein the following Conditional Expression (3-1) is satisfied.

$$4.5 < h2/h1 < 7 \quad (3\text{-}1)$$

8. The imaging lens according to claim 1,
wherein in a case where a focal length of a positive lens of the first sub-lens group on the reduced side is set to f3, and a focal length of a positive lens of the first sub-lens group on the magnified side is set to f1, the following Conditional Expression (4) is satisfied.

$$1 < f3/f1 < 1.4 \quad (4)$$

9. The imaging lens according to claim 1,
wherein the first imaging optical system includes a cemented lens in which a first positive lens, a second negative lens having a smaller Abbe number than that of the first positive lens, and a third positive lens having a larger Abbe number than that of the second negative lens are cemented together in order from the magnified side.

10. The imaging lens according to claim 9,
wherein in a case where an Abbe number of the first positive lens is set to vdc1, and an Abbe number of the second negative lens is set to vdc2, the following Conditional Expression (5) is satisfied.

$$20 < vdc1 - vdc2 < 40 \quad (5)$$

11. The imaging lens according to claim 9,
wherein in a case where an Abbe number of the second negative lens is set to vdc2, and an Abbe number of the third positive lens is set to vdc3, the following Conditional Expression (6) is satisfied.

$$-70 < vdc2 - vdc3 < -50 \quad (6)$$

12. The imaging lens according to claim 9,
wherein in a case where a focal length of the whole system during focusing on an infinite object is set to f, and a focal length of the cemented lens is set to fc, the following Conditional Expression (7) is satisfied.

$$-0.15 < |f|/fc < 0 \quad (7)$$

13. The imaging lens according to claim 9,
wherein in a case where a focal length of the whole system during focusing on an infinite object is set to f, and a focal length of the first positive lens is set to fc1, the following Conditional Expression (8) is satisfied.

$$0.05 < |f|/fc1 < 0.3 \quad (8)$$

14. The imaging lens according to claim 9,
wherein in a case where a focal length of the whole system during focusing on an infinite object is set to f, and a focal length of the second negative lens is set to fc2, the following Conditional Expression (9) is satisfied.

$$-0.5 < |f|/fc2 < -0.1 \quad (9)$$

15. The imaging lens according to claim 9,
wherein in a case where a focal length of the whole system during focusing on an infinite object is set to f, and a focal length of the third positive lens is set to fc3, the following Conditional Expression (10) is satisfied.

$$0.1 < |f|/fc3 < 0.4 \quad (10)$$

16. The imaging lens according to claim 1,
wherein in a case where a focal length of the whole system during focusing on an infinite object is set to f, and a focal length of the first imaging optical system is set to fa, the following Conditional Expression (11) is satisfied.

$$0.1 < |f|/fa < 0.7 \quad (11)$$

17. The imaging lens according to claim 1,
wherein in a case where a focal length of the whole system during focusing on an infinite object is set to f, and a focal length of the second imaging optical system is set to fb, the following Conditional Expression (12) is satisfied.

$$0.03 < |f|/fb < 0.2 \quad (12)$$

18. The imaging lens according to claim 1,
wherein the focus lens group consists of one lens.

19. A projection-type display apparatus comprising:
a light source;
a light valve on which light from the light source is incident; and
the imaging lens according to claim 1 as an imaging lens that projects an optical image of light optically modulated by the light valve onto a screen.

20. An imaging apparatus comprising the imaging lens according to claim 1.

* * * * *